Aug. 2, 1966 L. A. KOLZE 3,263,924
HEATING AND COOLING ZONE VALVE
Filed Sept. 13, 1963 3 Sheets-Sheet 2

INVENTOR.
Lawrence A. Kolze
BY
Hill, Sherman, Meroni, Gross Simpson
ATTORNEYS

Aug. 2, 1966  L. A. KOLZE  3,263,924
HEATING AND COOLING ZONE VALVE
Filed Sept. 13, 1963  3 Sheets-Sheet 3
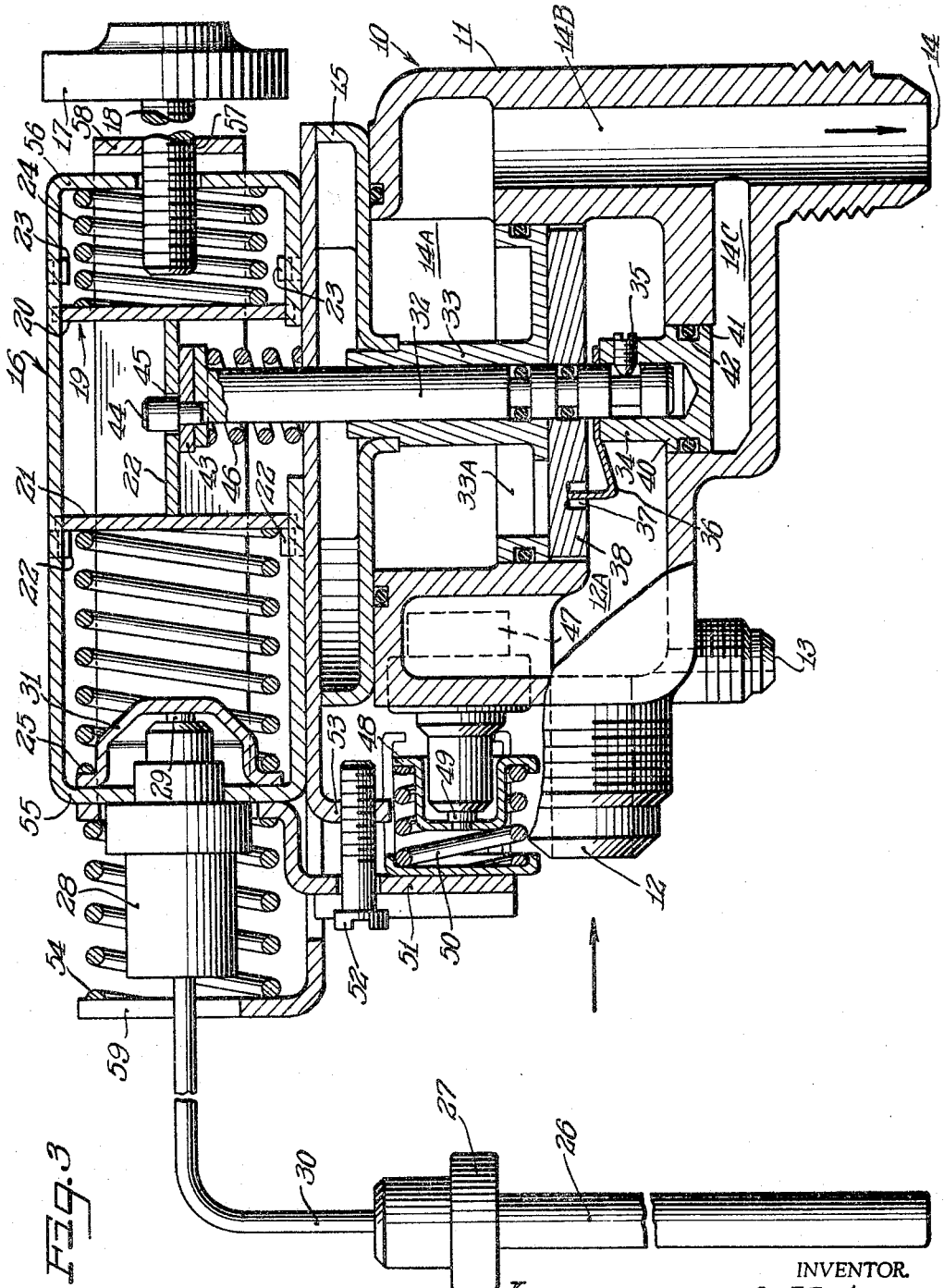
INVENTOR.
Lawrence A. Kolze
BY
ATTORNEYS

United States Patent Office 3,263,924
Patented August 2, 1966

3,263,924
HEATING AND COOLING ZONE VALVE
Lawrence A. Kolze, Bensenville, Ill., assignor to The Dole Valve Company, Morton Grove, Ill., a corporation of Illinois
Filed Sept. 13, 1963, Ser. No. 308,896
6 Claims. (Cl. 236—1)

This invention relates to fluid control valves, and more particularly to a fluid control valve of the type operable by temperature. More particularly, the invention relates to a fluid control valve for use in a heating system or a cooling system employing a thermally sensitive element to provide the motive power to operate the valve, and a thermally sensitive element to convert the valve from heating control to cooling control.

Valves which can be operated automatically as a function of the temperature in a zone ambient the valve are commonly referred to as zone valves. Such valves can be employed to control the flow of heated or cooled liquid through radiators or the like. There is an increasing trend toward the usage of zone valves, particularly in apartments, and motels, as well as in large homes where single point thermostatic control of multiple heating units cannot satisfactorily correlate operation of those heating units with the varying temperatures in multiple rooms.

Recently, attempts have been made to use fluid circulating systems required to heat such living quarters in the winter in a second capacity—as a circulating system for cooled liquid fluid during the summer for air conditioning. It has been found, however, that many thermostatically actuable fluid control valves are not adapted for use in most types of systems. A system which requires all of its valves to be removed and different valves inserted each time the seasons change is most undesirable. Furthermore, a system which requires all of its room temperature sensing elements (such as thermostats, or the like) to be converted from heating control to cooling control is also undesirable and time consuming.

It is therefore an object of this invention to provide a zone valve for use on a fluid circulating system which automatically converts itself to heating control and to cooling control.

It is a further object of this invention to provide a zone valve having a header assembly which slides relative to the body of the valve upon the automatic conversion of the valve from heating control to cooling control.

It is a further object of this invention to provide a zone valve having a thermally sensitive element positioned adjacent the fluid inlet so as to automatically convert the valve to heating control or to cooling control.

It is a further object of this invention to provide a zone valve having a fluid by-pass which permits a small amount of fluid to continuously flow out of the valve, thus maintaining the temperature of the fluid within the zone valve at the temperature of the fluid within the heating unit or cooling unit.

It is a further object of this invention to provide a zone valve which automatically controls the temperature of a predetermined living area, but which also may be manually adjusted to satisfy personal temperature requirements.

Briefly, the embodiment of the invention disclosed herein comprises a zone valve for use in a fluid circulating system of the type in which heated fluid is circulated in the winter and chilled fluid is circulated in the summer. This zone valve embodys a fluid by-pass which allows a small amount of fluid to continuously enter the valve inlet, pass through a portion of the valve, then out of the valve. A temperature sensitive element is placed adjacent the valve inlet so as to be responsive to the temperature of the fluid passing therethrough. The temperature sensitive element, if actuated (as for example, upon response to heated fluid being passed into the valve inlet) moves a header assembly which is slidably mounted on the valve, so as to convert the valve to heating control. A thermally sensitive element is also placed in the zone (or area to be temperature controlled) and provides the motive power for opening or closing the valve.

The invention will be more fully understood from the following detailed description of an embodiment thereof:
On the drawings:

FIGURE 1 is a cross-sectional view of the heating and cooling zone valve of the instant invention, showing the two thermally sensitive elements and their relationship with the zone valve. Also shown is the control shaft for the shear disk, which extends upward into the header assembly positioned at the upper part of the valve. The valve is shown in the position it assumes for heating control.

FIGURE 3 is substantially the same as FIGURE 1, except with the valves in the position it assumes for cooling control.

Figure 1:
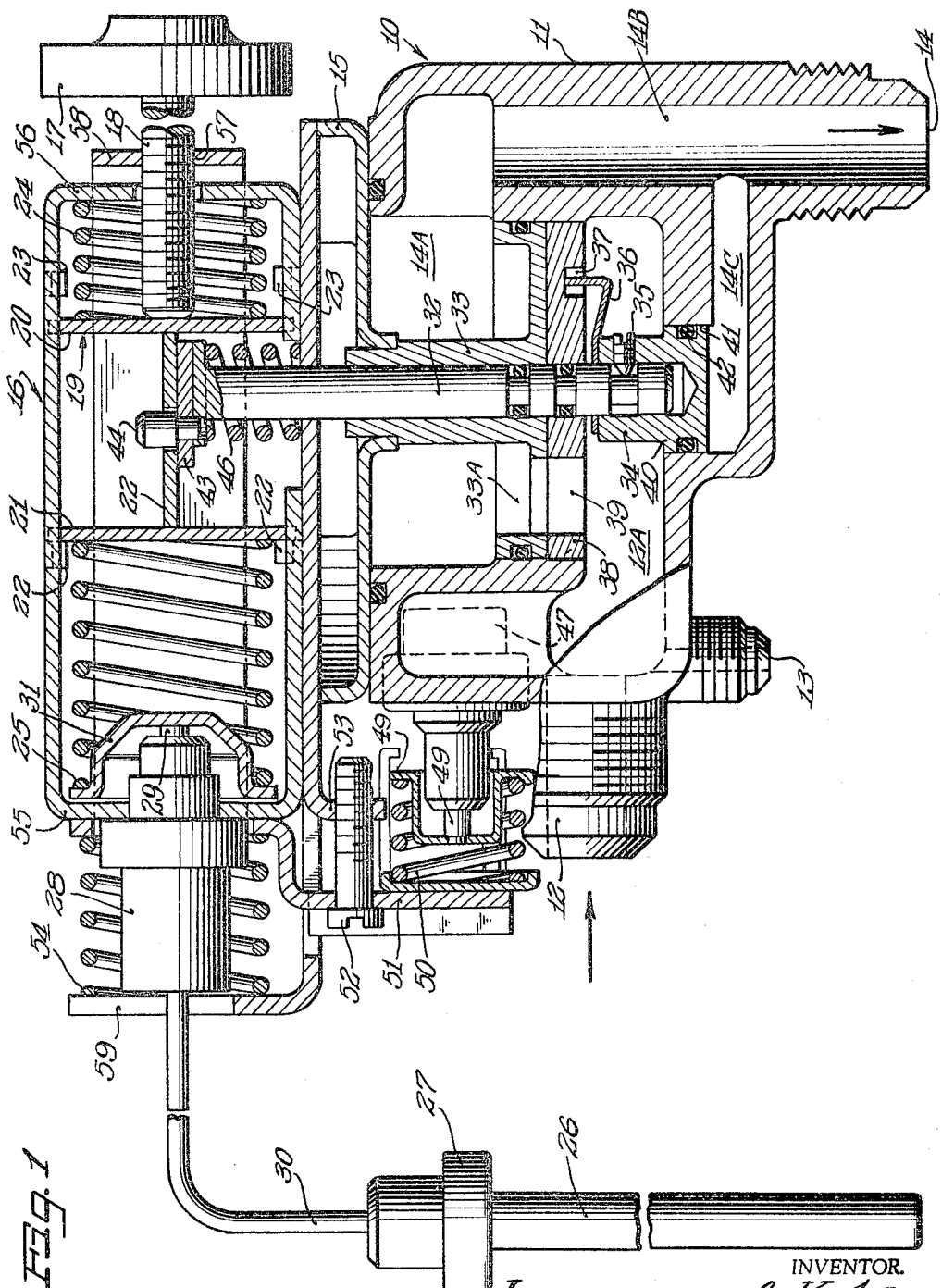

Referring now to the drawings, in FIGURE 1 is shown the heating-cooling valve of the instant invention indicated by the numeral 10. It should be noted at the outset that the valve 10 may be used in any position, and that the natural force of gravity does not affect its operation in any way. For the moment, however, in order to facilitate explanation of the operation of the valve 10, consider the valve 10 as having been installed in the position shown in FIGURES 1 and 3.

The valve 10 includes a casting 11 having an inlet 12, a bypass 13, and an outlet 14. The inlet 12 opens into a chamber 12A, and the outlet 14 includes a chamber 14A, a passage 14B and an equalizing tube 14C. Mounted atop the casting 11 is a stationary frame 15. A header assembly 16, having a primary end 55 and a secondary end 56, is slidable relative to this frame. The header assembly 16 thus functions as a carriage relative to the valve 10. The header assembly 16 carries a temperature adjustment knob 17 at the secondary end 56. The knob 17 has a shaft 18 threadably engaging an aperture 57 in an auxiliary frame 58 mounted on the header assembly 16. An H-member 19 having two legs 20 and 21, and a crossbar 22 is slidably mounted on the header assembly 16 between a pair of stops 22 and a pair of stops 23. The inner end of the shaft 18 is adjacent the leg 20 of the H-member 19. The shaft 18 can be adjusted (by rotation of the knob 17) until it abuts the leg 20—to serve as a movable stop, temporarily replacing the pair of stops 23.

In this manner, the H-member 19 can be permitted full movement between the stops 22 and 23, or it can be restricted to any desired movement between the pair of stops 22 and the inner ends of the shaft 18. By adjusting the shaft 18, the operator can change the relative position of member 31 with respect to the associated temperature sensitive element so that piston 29 must engage 31 at different positions depending upon the temperature setting desired to effect thermostatic adjustment of the valve.

A temperature sensing bulb 26 is coupled to a temperature responsive unit 27, which in turn, is communicable to an actuator 28 (having a movable piston 29) through a capillary 30. It is known to those skilled in the art that when the temperature ambient to the sensing bulb 26 rises above the critical temperature of the substance contained therein, that substance will expand. In the instant case, such expansion forces will be communicated through the capillary 30 to the actuator 28, causing the piston 29 to move outward relative to the actuator 28. The actuator 28 is mounted at the primary end 55 of the header assembly 16 and the piston 29 rests against a retainer member 31. The retainer member 31 is not fastened to the inner surface of the primary end of 55 of the header assembly 16, but is held adjacent the end of the piston 29 by the spring 24 acting through the H-member 19. Therefore, when the temperature ambient to the bulb 26 rises, the piston 29 is pushed outward, and the retainer member 31 will move to the right. Since the coil spring 25 is very stiff, movement of the retainer member 31 to the right moves the H-member 19 to the right. When the H-member 19 comes against the pair of stops 23, the H-memebr 19 stops, and the coil spring 25 absorbs any overtravel of the piston 29, so as to avoid damage to the pair of stops 23 or actuator 28.

Notice that a shaft 32 extends from the casting 11 of the valve 10 upward into the header assembly 16. The shaft 32 is journalled through a stationary seal disk 33 (having a number of apertures 33A) which is mounted in the casting 11. At its lower end, the shaft 32 carries a plug 34, secured to the shaft 32 by a setscrew 35. A spider 36 is securely mounted atop the plug 34 for engagement with a number of depressions 37 in a shear disk 38. The spider 36 presses the shear disk 38 tightly against the seal disk 33 and also transmits rotational movement of the shaft 32 to the disc 38 in response to the upper end of the spider 46 engaging the depression 37 to apply a tangential force to the disk 38. The shear disk 38 has a plurality of ports 39 therein, corresponding to the apertures 33A in the seal disk 33. There may be a number of such apertures 33A, preferably pie-shaped. The depressions 37 may be spaced between selected ones of the ports 39 so as to evenly distribute the upward pressure exerted on the shear disk 38 by the spider 36. The plug 34 has a slightly enlarged portion 40 which extends into an opening 41 in the wall of the casting 11 between the chambers 12A and 14C. A sealing ring 42 prevents passage of liquid past the portion 40 of the plug 34.

By reason of the aforementioned construction the plug 34 can be used to balance the forces caused by pressure differences existing across the disk 38. The plug 34 can be formed with surface areas opening to the chamber 14C or to the chamber 12A as desired in accordance with the use to which the valve is to be put in order to provide the proper pressure balance on the rotary valve. It will be understood however, that under normal household water pressure conditions it may not be necessary to employ the plug 34 at all.

Figure 2:
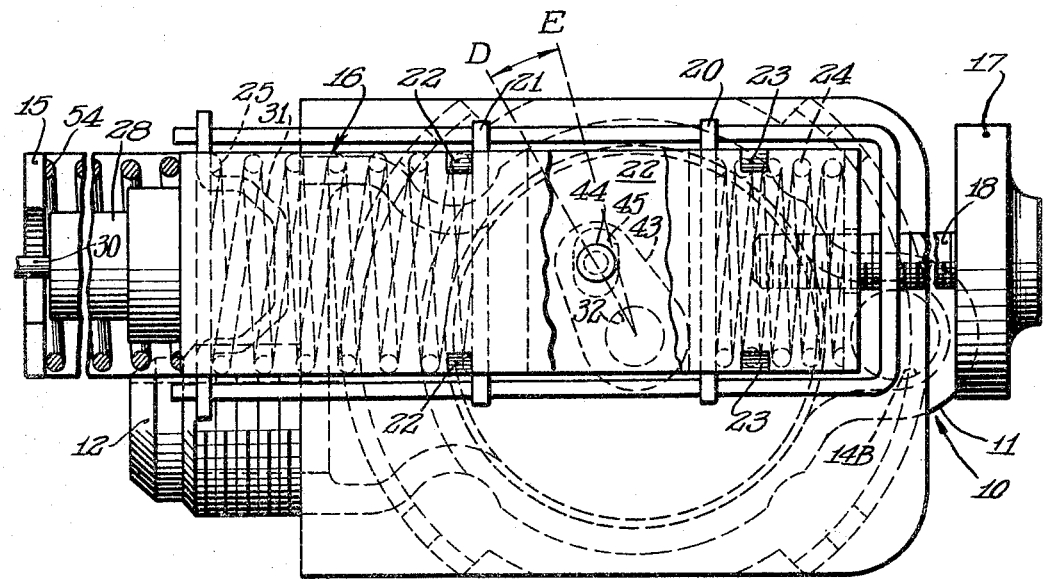
FIGURE 2 is a top view of the zone valve of FIGURE 1, showing the end of the control shaft and a crank which is mounted to the control shaft. Also shown in dotted lines is a representation of the span of movement of the crank during heating control.

At its upper end, the shaft 32 carries a crank 43 (lying beneath the crossbar 22 of the H-member 19) which in turn carries a finger 44. As seen in FIGURE 2, the finger 44 protrudes through an elongated hole 45 in the crossbar 22. A spring 46 presses against the lower surface of the crank 43 so as to urge the shaft 32 upward.

If the H-member 19 is moved in either direction along the header assembly 16 the crank 43 will be pivoted so as to rotate the shaft 32. For example, if while the header assembly 16 and the H-member 19 are in the position shown in FIGURES 1 and 2, the temperature is raised adjacent the sensing bulb 26 to 78° F. (for example) the piston 29 will move outward, so as to move the H-member 19 (and crossbar 22) to the right, carrying with it the finger 44. This pivots the crank 43 (clockwise as viewed in FIGURE 2) and rotates the shaft 32. This movement continues until the leg 20 of the H-member 19 strikes the pair of stops 23.

As the shaft 32 rotates clockwise, it rotates the shear disk 38 relative to the seal disk 33, to misalign the apertures 33A and the ports 39 and thus stop the flow of fluid into the chamber 14A. On the other hand, if the temperature at the sensing bulb 26 drops to 69° F. (for example) the piston 29 will be forced inward by the spring 24 and the H-member 19 will return to a position against the pair of stops 22. This will rotate the crank 43 and the shaft 32 counterclockwise, and align the apertures 33A with the ports 39.

As previously described, the by-pass 13 is provided in the casting 11 adjacent the inlet 12. In this manner, fluid is not allowed to stand idle in the chamber 12A even when the apertures 33A are out of alignment with the ports 39. The by-pass 13 has a small bore, so as to allow a relatively small volume of fluid to pass therethrough. The by-pass 13 thus insures that the temperature of the fluid within the chamber 12A is substantially the same temperature as the fluid in the pipes (not shown) leading up to the inlet 12. That is to say, if fluid at a temperature of 200° F. (at a boiler) is flowing through a relatively long pipe to the inlet 12, the temperature of the fluid within the chamber 12A will be approximately 200° F., because the fluid is never allowed to stand idle in the pipe. Likewise, if fluid at 35° F. (at an air conditioning cooler system) is flowing to the inlet 12, the temperature of the fluid within the chamber 12A will be approximately 35°.

In order to automatically control the position of the header assembly 16 relative to the stationary frame 15, a thermally sensitive element 47 (having a plunger 49) is placed in the casting 11 near the inlet 12. This element 47 is preferably constructed so as to become actuated in the 60° to 70° F. temperature range. In other words, the plunger 49 is fully retracted at a temperture (of the fluid in chamber 12A) below 60° F., and is fully extended at temperatures in excess of 70° F. The piston 49 is shown in its fully extended position in FIGURE 1. Notice that the piston 49 engages a buffer 48 which is held against the piston 49 by a spring 50. The other end of the spring 50 rests against a Z-plate 51 which extends upward along the side of the valve 10, and is secured to the primary end 55 of the head assembly 16. An adjustment screw 52 extends through the Z-plate 51 (but is free to rotate relative thereto) and threadably engages a lip 53 extending from the stationary frame 15. The screw 52 thus serves as a stop, to limit the movement of the Z-plate 51 from excessive travel to the left (as viewed in FIGURE 1). The spring 50 is very stiff, so that movement of the plunger 49 (and the buffer 48) is imparted directly to the Z-plate 51. However, the spring 50 will absorb any excessive travel of the plunger 49 (that is, movement of the plunger 49 after the Z-plate 51 has reached its maximum displacement to the left) so as to prevent excessive overloading of the element 47. A spring 54 is positioned between a turned up end 59 of the stationary frame 15 and the end of the header assembly 16 to place constant inward pressure on the plunger 49 and thus insure that the header assembly 16 will move to the right when the plunger retracts.

The valve 10 of the instant invention is constructed so as to be preferably used as a zone valve in a system which employs a fluid to heat a dwelling (or the like) in the winter, and a fluid to cool the dwelling in the summer. The valve 10 may be placed, for example, at the entrance to a heating-cooling radiator, and the temperature sensing bulb 26 may be placed on a wall in a zone adjacent the valve 10 in order to control operation of the valve as a function of the temperature within the zone. The valve as shown in FIGURES 1 and 2 is in the position it automatically assumes for winter or heating operation. That is to say, the thermally sensitive element 47 is shown in its actuated position (by reason of fluid at about 200° F. constantly flowing into the chamber 12A) with the plunger 49 extended and the header assembly 16 moved to its left-most position. It should be noted that the thermally sensitive element 47 is initially operated when heated fluid is diverted into the pipe of the circulating system in early fall. By reason of the aforementioned bypass arrangement, the element 47 remains continuously operated throughout the winter. In the spring or summer, when the temperature of the atmosphere (and that inside the dwelling) rises such that it is uncomfortable—say to 78° F. or the like, and chilled fluid is diverted into the circulating system, the thermally sensitive element 47 will be cooled and will retract the piston 49, so as to move the header assembly 16 to its extreme right position.

It should be noted that the header assembly 16 is shifted (by means of the sensing element 47) in order that the entire valve 10 with its sensing bulb 26 can be used for both heating control and cooling control, with no costly adjustment or removal of the valve 10 or adjustment of the sensing bulb 26. The crank 43 is movable (during winter or heating control) from a position indicated in FIGURE 2 by the imaginary line E (when the apertures 33A are open as viewed in FIGURE 1) to a position E (when the apertures 33A are closed as viewed in FIGURE 3).

As the temperature of the zone (in which the sensing bulb 26 is placed) rises, say to 78° F., the temperature responsive element 27 causes the piston 29 to be pushed outward, pushing the H-member 19 to the right, moving the crank 43 crosswise to the position E to stop the flow of heated fluid to the valve 10. To insure that the above movement of the crank 43 from the line D to the line E is sufficient to fully misalign the apertures 33A and the ports 39, it is necessary that the arcuate distance between the line D and the line E be slightly greater than the arcuate width of the pie-shaped apertures 33A and 39.

Figure 4:
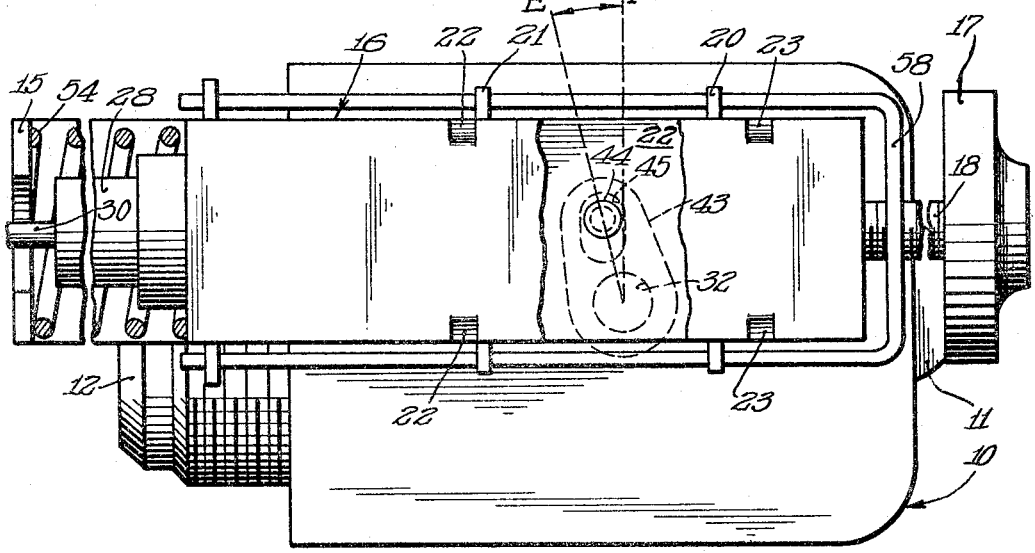
FIGURE 4 is a top view of the control shaft and crank of FIGURE 3, showing in dotted lines a representation of the span of movement of the crank during cooling control.

The header assembly 16 is positioned for summer (or cooling operation as shown in FIGURES 3 and 4). As previously described, the header assembly 16 moves to this position automatically when chilled fluid is diverted into the chamber 12A. Notice that the valve 10 is (by reason of the position of the header assembly 16) normally closed for the summer or cooling control as shown by the line E. As the temperature of the zone (in which the sensing element 26 is placed) rises above that which is comfortable, say to 78° F., the temperature responsive unit 27 is activated. This causes the piston 29 to be pushed outward, pushing the H-member 19 to the right, moving the crank 43 crosswise to the position F, shown in FIGURE 4, to permit the flow of chilled fluid through the valve 10.

The temperature adjustment knob 17 is adjusted when it is desired to adjust the temperature setting as heretofore explained to vary the effect the power unit piston 29 will have on the rotary disk valve. In addition the knob can be used as a main line valve. For example, during winter control the knob 17 can be adjusted until the shaft 18 pushes the H-member 19 against the pair of stops 22. This will prevent the valve 10 from closing and will allow heated fluid to continuously flow through the valve, regardless of the temperature at the sensing bulb 26. Likewise, during summer control the knob 17 may be rotated until the shaft 18 pushes the H-member 19 against the pair of stops 22. This will prevent the valve 10 from opening and will stop the flow of chilled fluid through the valve 10, regardless of the temperature at the sensing bulb 26.

Thus it is observed, that the valve of the instant invention is fully automatic in its conversion from heating control to cooling control. There is no need for expensive replacement of the valve or any adjustment of the valve, or adjustment of a thermostat in order to convert the valve from heating control to cooling control. Furthermore, the valve is provided with a unique header assembly which is slidable relative to the body of the valve. This header assembly provides a simple and economical technique for applying the power transmitted by the thermally sensitive bulb to the shear valve.

While the invention has been described with reference to a particular embodiment, other applications will be readily apparent to those skilled in the art. The invention, therefore, should not be limited to the particular arrangement shown and described but should cover all modifications, within the spirit and scope of the appended claims.

I claim as my invention:
1. In a fluid control valve:
  (a) a valve body including an inlet and an outlet and a flow port communicating said inlet with said outlet,
  (b) a carriage mounted on said valve body and having a slider member mounted thereon,
  (c) a first thermally sensitive element in said valve body adjacent said inlet and having an operating piston movable in response to changes in the temperature of the fluid flowing through said inlet,
  (d) said carriage coupled to said operating plunger for movement therewith,
  (e) a shaft journaled for rotary movement within said body having a valve disc mounted thereon and rotatable therewith and overlying said port,
  (f) an aperture in said disc positionable in registry with said port to permit maximum fluid flow through said valve, whereby rotation of said disc to move said aperture out of registry with said port will decrease the flow of fluid through said valve,
  (g) a radially extending lever connected to said shaft for rotation therewith,
  (h) a rectilinearly movable element pivotally connected to a free end of said lever, whereby rectilinear movement of said element will effect rotary movement of said shaft,
  (i) a second thermally responsive element mounted on said body and having an operating piston extensible therefrom in response to changes in temperature ambient said second element,
  (j) said rectilinearly movable element coupled to said operating piston for movement therewith,
  (k) whereby said shaft is rotated in response to the temperature ambient said second element.
2. In a fluid control valve:
  (a) a thermally responsive element sensitive to the ambient temperature of the atmosphere, and having an operation plunger movable in response to changes in the atmospheric temperature,
  (b) a valve body including an outlet, and an inlet,
  (c) a header assembly mounted on said valve body, and having a primary end and a secondary end,
  (d) an H-shaped member slidably mounted on said header assembly, the crosspiece of said H-shaped member having an elongated aperture therein,
  (e) a first spring positioned on one side of said H-member,
  (f) a retainer engageable by said piston, said first spring positioned between said retainer and said one side of said H-member, and being relatively stiff whereby movement of said piston toward said H-member is translated to said H-member,
  (g) a second spring positioned between the other side of said H-member and said secondary end of said header assembly,
  (h) a control shaft extending from said header assembly into said valve body, said control shaft having a crank secured to its upper end, said crank including a pin extending into said elongated aperture in said cross-piece, so that sliding movement of said H-member moves said pin in an arc, and in turn, rotates said control shaft,
  (i) a seal disc mounted in said valve body between said inlet and said outlet, said seal disc having a plurality of apertures therein,

(j) a shear disc positioned for rotational movement adjacent said seal disc, said shear disc having a plurality of ports therein, said shear disc coupled to said control shaft, whereby rotation of said control shaft rotates said shear disc relative to said seal disc to position said ports relative to said apertures.

3. In a fluid control valve:
(a) a first thermally responsive element sensitive to the ambient temperature of the atmosphere, and having an operating piston movable in response to changes in the atmospheric temperature,
(b) a valve body including an outlet, and an inlet,
(c) a header assembly mounted on said valve body, and having a primary end and a secondary end,
(d) an H-shaped member slidably mounted on said header assembly, the cross-piece of said H-member having an elongated aperture therein,
(e) a first spring positioned on one side of said H-member,
(f) a retainer engageable by said piston, said first spring positioned between said retainer and said one side of said H-member, and being relatively stiff, whereby movement of said piston towards said H-member is translated to said H-member,
(g) a second spring positioned between the other side of said H-member and said secondary end of said header assembly,
(h) a second thermally sensitive element positioned adjacent said valve inlet, and having an operating plunger movable in response to changes in the temperature of the fluid flowing through said inlet,
(j) a buffer engageable by said plunger,
(k) a Z-shaped bar secured to said primary end of said header assembly and extending along said valve body opposite said plunger,
(l) a third spring, positioned between said buffer and said Z-bar and being relatively stiff, whereby movement of said plunger towards said Z-bar is translated to said Z-bar and to said header assembly,
(m) a control shaft extending from said header assembly into said valve body, said control shaft having a crank secured to its upper end, said crank including a pin extending into said elongated aperture in said cross piece, whereby sliding movement of said H-member moves said pin in an arc and rotates said control shaft,
(n) a seal disc mounted in said valve body between said inlet and said outlet, said seal disc having a plurality of apertures therein,
(o) a shear disc positioned for rotational movement adjacent said seal disc, said shear disc having a plurality of ports therein, said shear disc coupled to said control shaft, whereby rotation of said control shaft rotates said shear disc relative to said seal disc to position said ports relative to said apertures.

4. In a fluid control valve:
(a) a first thermally responsive element sensitive to the ambient temperature of the atmosphere, and coupled to an actuator having an operating piston movable in response to changes in the atmospheric temperature,
(b) a valve body including an outlet, and an inlet,
(c) a frame mounted atop said valve body,
(d) a header assembly slidably mounted on said frame and having a primary end and a secondary end, said actuator mounted on said primary end of said header assembly,
(e) an H-shaped member slidably mounted on said header assembly intermediate said primary end and said secondary end, the cross-piece of said H-member having an elongated aperture therein,
(f) said header assembly having stop means positioned on either side of and spaced from said H-member for engagement with one side of said H-member when said H-member is in a first position, and for engagement with the other side of said H-member when said H-member is in a second position,
(g) a first spring positioned on said one side of said H-member,
(h) a retainer engageable by said piston, said first spring positioned between said retainer and said one side of said H-member, and being relatively stiff, whereby movement of said piston toward said H-member is translated to said H-member,
(i) a second spring positioned between said other side of said H-member and said secondary end of said header assembly, so as to urge said retainer toward said operating piston,
(j) a second thermally sensitive element positioned in said valve inlet, and having an operating plunger movable in response to changes in the temperature of the fluid flowing through said inlet,
(k) a buffer engageable by said plunger,
(l) a Z-shaped bar secured to said primary end of said header assembly and extending along said valve body opposite said plunger,
(m) a third spring, positioned between said buffer and said Z-bar and being relatively stiff, whereby movement of said plunger toward said Z-bar is translated to said Z-bar and to said header assemby.

5. In a fluid control valve as claimed in claim 4 wherein:
(a) said frame has an upturned end spaced from said primary end,
(b) a fourth spring is positioned between said upturned end and said primary end, so as to urge said buffer toward said operating plunger.

6. In a fluid control valve as claimed in claim 5 wherein:
(a) a control shaft extends from said header assembly into said valve body, said control shaft having a crank secured to its upper end, said crank including a pin extending into said elongated aperture in said cross-piece, whereby sliding movement of said H-member moves said pin in an arc and rotates said control shaft,
(b) a seal disc is mounted in said valve body between said inlet and said outlet, said seal disc having a plurality of pie-shaped apertures therein,
(c) a rotary shear valve positioned for rotational movement adjacent said seal disc, said rotary shear valve having a plurality of pie-shaped ports therein, said rotary shear valve coupled to said control shaft, whereby rotation of said control shaft rotates said rotary shear valve relative to said seal disc from an open position at which said pie-shaped ports are in alignment with said pie-shaped apertures, to a closed position at which said pie-shaped ports are out of alignment with said pie-shaped apertures,
(d) said header assembly having a position relative to said frame for heating control when said operating plunger is extended,
(e) whereby when said header assembly is in said heating control position, and said H-member is in said first position, said pie-shaped ports are in alignment with said pie-shaped apertures, and when said H-member is in said second position, said pie-shaped ports are out of alignment with said pie-shaped apertures.

References Cited by the Examiner
UNITED STATES PATENTS 2,557,035 6/1951 Lichty _____ 236—99 X
2,805,025 9/1957 Dillman _____ 236—1

EDWARD J. MICHAEL, *Primary Examiner.*